United States Patent
Marienfeld et al.

(10) Patent No.: US 8,616,537 B2
(45) Date of Patent: Dec. 31, 2013

(54) ADAPTIVE MOTOR MOUNT

(75) Inventors: Peter Marienfeld, Marklohe (DE); Hans-Jürgen Karkosch, Hemmingen (DE); Bernhard Uhrmeister, Hannover (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 13/529,350

(22) Filed: Jun. 21, 2012

(65) Prior Publication Data

US 2012/0274009 A1    Nov. 1, 2012

Related U.S. Application Data

(63) Continuation of application No. PCT/EP2010/065081, filed on Oct. 8, 2010.

(30) Foreign Application Priority Data

Dec. 21, 2009  (DE) .......................... 10 2009 059 234

(51) Int. Cl.
*F16F 5/00*        (2006.01)
*F16F 15/00*       (2006.01)

(52) U.S. Cl.
USPC ................................................... 267/140.14

(58) Field of Classification Search
USPC ....................... 267/140.13–140.15
See application file for complete search history.

(56) References Cited

U.S. PATENT DOCUMENTS

| 4,610,421 | A | | 9/1986 | Ohta et al. |
|---|---|---|---|---|
| 4,660,812 | A | | 4/1987 | Dan et al. |
| 4,793,600 | A | * | 12/1988 | Kojima .................... 267/140.14 |
| 4,877,225 | A | * | 10/1989 | Noguchi et al. ......... 267/140.14 |
| 5,344,127 | A | | 9/1994 | Hettler et al. |
| 5,462,261 | A | | 10/1995 | Eckel et al. |
| 6,523,816 | B1 | * | 2/2003 | Gastineau et al. ....... 267/140.14 |
| 6,921,067 | B2 | | 7/2005 | Gries et al. |
| 7,275,739 | B2 | * | 10/2007 | Winkler ................... 267/140.14 |
| 2011/0042872 | A1 | * | 2/2011 | Hasegawa et al. ....... 267/140.14 |
| 2011/0042873 | A1 | * | 2/2011 | Yamamoto et al. ...... 267/140.14 |
| 2012/0049424 | A1 | * | 3/2012 | Bradshaw et al. ....... 267/140.14 |

FOREIGN PATENT DOCUMENTS

| EP | 0 852 304 A1 | 7/1998 |
|---|---|---|
| EP | 1 426 651 A1 | 6/2004 |

OTHER PUBLICATIONS

International Search Report dated Jan. 20, 2011 of international application PCT/EP 2010/065081 on which this application is based.

* cited by examiner

*Primary Examiner* — Anna Momper
(74) *Attorney, Agent, or Firm* — Walter Ottesen P.A.

(57) ABSTRACT

A hydraulic mount includes a closable bypass and a decoupling membrane. When the bypass is opened, however, the main effect that can be achieved by opening the bypass, namely the decrease in the spring rate at higher frequencies, is worsened. It is thus desirable to render the decoupling membrane ineffective when the bypass is open. The aim is achieved in that the closure device of the bypass includes blocking elements for blocking the decoupling membrane in the first switching position of the closure device when the bypass is open and can be released in the second position of the closure device when the bypass is closed.

4 Claims, 4 Drawing Sheets

ADAPTIVE MOTOR MOUNT

CROSS REFERENCE TO RELATED APPLICATIONS

This application is a continuation application of international patent application PCT/EP 2010/065081, filed Oct. 8, 2010, designating the United States and claiming priority from German application 10 2009 059 234.2, filed Dec. 21, 2009, and the entire content of both applications is incorporated herein by reference.

FIELD OF THE INVENTION

The invention relates to a hydraulic mount with a fluid-filled working chamber with an elastomeric spring element and a fluid-filled equalizing chamber with an elastomeric equalizing membrane and a throttle plate, which separates the working chamber and the equalizing chamber from each other, wherein: the working chamber and the equalizing chamber have volumes that change in an interacting manner by elastic deformation of at least one elastomer body; the throttle plate has a damping channel, by way of which the working chamber is in fluid-conducting communication with the equalizing chamber; the throttle plate has a decoupling membrane acting parallel to the throttle channel; and, the throttle plate has a bypass, by way of which the working chamber and the equalizing chamber are in fluid-conducting communication in the open state of the bypass, and the bypass can be opened and closed by a closure device having a closure part and a drive, the closure device being movable parallel to the axis of the bypass and the opening direction of the closure device being opposite to the main direction of effect of the pressure in the working chamber.

BACKGROUND OF THE INVENTION

Such mounts are known per se and are frequently used in motor vehicles, in particular as engine mounts. Mounts of this type have proven very successful in damping both low-frequency vibrations and high-frequency vibrations. If the through-opening in the partition wall is closed, high-frequency vibrations with small amplitudes are isolated well by the configuration of the throttle plate and the membrane arranged therein. As soon as the bypass in the throttle plate is open, low-frequency vibrations, for example during idling, are isolated even better. The bypass in the throttle plate can be closed by a closure device.

For resiliently elastic support, for example of the engine in a motor vehicle, such a hydraulic mount usually has a supporting body of elastomeric material. The supporting body is located between fastening means arranged at a variable distance from each other. The interior space of the mount is divided by a rigid plate or throttle plate into two chambers of variable volume—a working chamber and an equalizing chamber. For damping low-frequency vibrations, the two chambers are connected to each other by way of a damping channel, also known as a throttle channel. Further developments of hydraulic mounts of the type in question have not only an elastic supporting body and a damping channel but usually also a decoupling membrane for isolating higher-frequency vibrations and may also have a controllable bypass.

Such a hydraulic mount with a controllable bypass is disclosed in U.S. Pat. No. 4,660,812. Here, the bypass can be closed by a closure plate and an adjusting device. In the case of mounts of this type of construction, pressure surges in the working chamber can in unfavorable cases act on the closure device in such a way that the bypass opens unintentionally. This can be avoided by a configuration of the closure device in which the opening direction of the closure device is opposed to the force effect of the pressure surges. Such a mount is disclosed, for example, in EP 0 852 304 B1.

To improve the vibrational behavior, mounts of the type in question have not only the mentioned throttle channel and the bypass but also usually a decoupling membrane arranged in the throttle plate. When there are higher frequency vibrations with small amplitudes, the membrane can vibrate at the same time correspondingly.

Such a mount is disclosed, for example, in U.S. Pat. No. 5,344,127. In the case of such an embodiment, however, the main effect that can be achieved by opening the bypass, that is lowering the spring rate at higher frequencies, is worsened. It is thus desirable to render the decoupling membrane ineffective when the bypass is open.

In EP 1 426 651 A1 there is disclosed a mount in which both the bypass can be opened and the decoupling membrane can be firmly clamped by way of an electromagnetically actuated slide. However, the slide acts transversely to the direction of effect of the mount and causes additional effort in terms of reducing the frictional forces and compensating for the fluid to be displaced.

SUMMARY OF THE INVENTION

It is an object of the invention to improve a mount of the type described at the beginning such that the ability of the decoupling membrane to vibrate can be blocked in a simple way when the bypass is open.

This object is achieved by the decoupling membrane being formed as a rigid plate which has a free path in the direction of vibration of the fluid against the throttle plate, and is thereby mounted in the throttle plate such that it can vibrate, and the closure device of the bypass has blocking elements by which the decoupling membrane can be blocked in the first switching position of the closure device when the bypass is open and can be released in the second position of the closure device when the bypass is closed.

This arrangement has the advantage that only very small frictional forces in the guides of the closure device have to be overcome, and both the bypass can be opened and at the same time the decoupling membrane can be blocked by just one movement of the closure device.

In a development of the invention, the closure device has springs assigned to the blocking elements, the springs having a force effect which is opposed to the opening direction of the closure device.

The arrangement of such springs has the advantage that the closing action of the closure device is retained even when the drive of the closure device is switched off. The assignment of the springs to the blocking elements has the advantage that the springs have a guide without additionally necessary components, so that failure of the closure device caused by buckling of the springs is minimized.

In a further embodiment of the invention, the drive of the closure device is formed as an electronically activatable stepping motor with a translatorily movable spindle.

The use of a stepping motor as the drive for the closure device has the advantage that a stepping motor is not destroyed by being supplied with current when at rest, so that in both switching positions of the closure device, the corresponding position can be maintained by the stepping motor. No switch off at limit is required. Since a stepping motor can be operated with low speed and high torque, no reduction gearing is required either.

In a further embodiment of the invention, the equalizing membrane has a continuation which is formed as a covering bellows, is connected in one piece to the equalizing membrane and is arranged on the side of the equalizing membrane that is facing away from the equalizing chamber in such a way that the covering bellows reaches around the spindle of the stepping motor and up to the stepping motor and is connected in a moisture-tight manner to the stepping motor.

This arrangement has the advantage that, for example when driving on poor terrain, in particular when driving through water, the spindle and the stepping motor are well protected against penetrating moisture.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
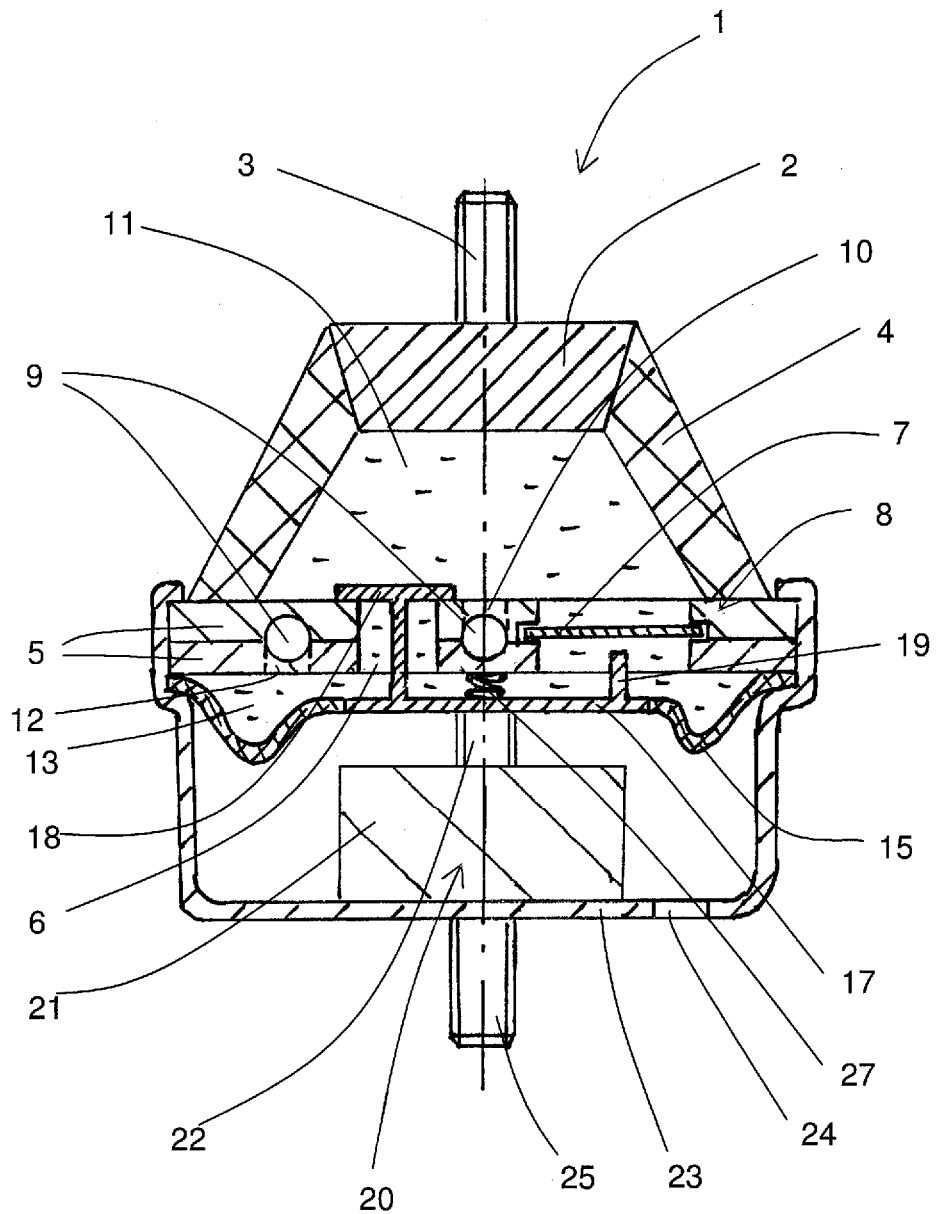
FIG. 1 shows a basic representation of a mount according to the invention with a closed bypass in a longitudinal section.

FIG. 1 shows the basic structure of an engine mount 1 according to the invention. The mount 1 has a connecting piece 2 with a fastening bolt 3, with which the mount 1 can be fastened to an engine (not shown) of a motor vehicle. The connecting piece 2 is vulcanized into a supporting spring 4 of elastomeric material. On the side that is facing away from the connecting piece 2, the supporting spring 4 is fastened in a fluid-tight manner to a throttle disc 5. The throttle disc 5 has a bypass 6 and a decoupling membrane 7. The decoupling membrane 7 is formed as a rigid plate and is mounted in a receptacle 8 in such a way that it can move in the axial direction against the throttle disc 5. The throttle disc 5 also comprises a throttle channel 9, which is in fluid-conducting communication at its first end 10 with a working chamber 11, at its second end 12 with an equalizing chamber 13. The equalizing chamber 13 is bounded not only by the throttle disc 5 but also by an equalizing membrane 15.

Vulcanized onto the equalizing membrane 15 in a fluid-tight manner is a closure device 17, the closure device 17 having a closure part 18, blocking elements 19, only one of which is shown here, and a drive 20.

The drive 20 comprises a stepping motor 21 and a spindle 22, which can be moved in a translatory manner by the stepping motor and is firmly connected to the closure device 17. The stepping motor 21 is supported against a mount pot 23 having a bore 24. The mount pot 23 is flanged firmly and in a fluid-tight manner to the throttle disc 5 and the equalizing membrane 15. It has at its outer end that is facing away from the connecting piece 2 a fastening bolt 25, with which the mount 1 can be fastened to a vehicle body (not shown).

In the position shown, the closure part 18 closes the bypass 6, so that a fluid 26, which is represented here by dashed lines and fills the working chamber 11 and the equalizing chamber 13 as well as the bypass 6 and the throttle channel 9, cannot flow through the bypass 6. A central spring 27 acts in a supporting manner in keeping the bypass 6 sealed.

If the bypass 6 is to be opened, the spindle 22 can be axially displaced by the stepping motor 21 in the direction of the working chamber 11, so that the closure part 18 clears the bypass 6.

Figure 2:
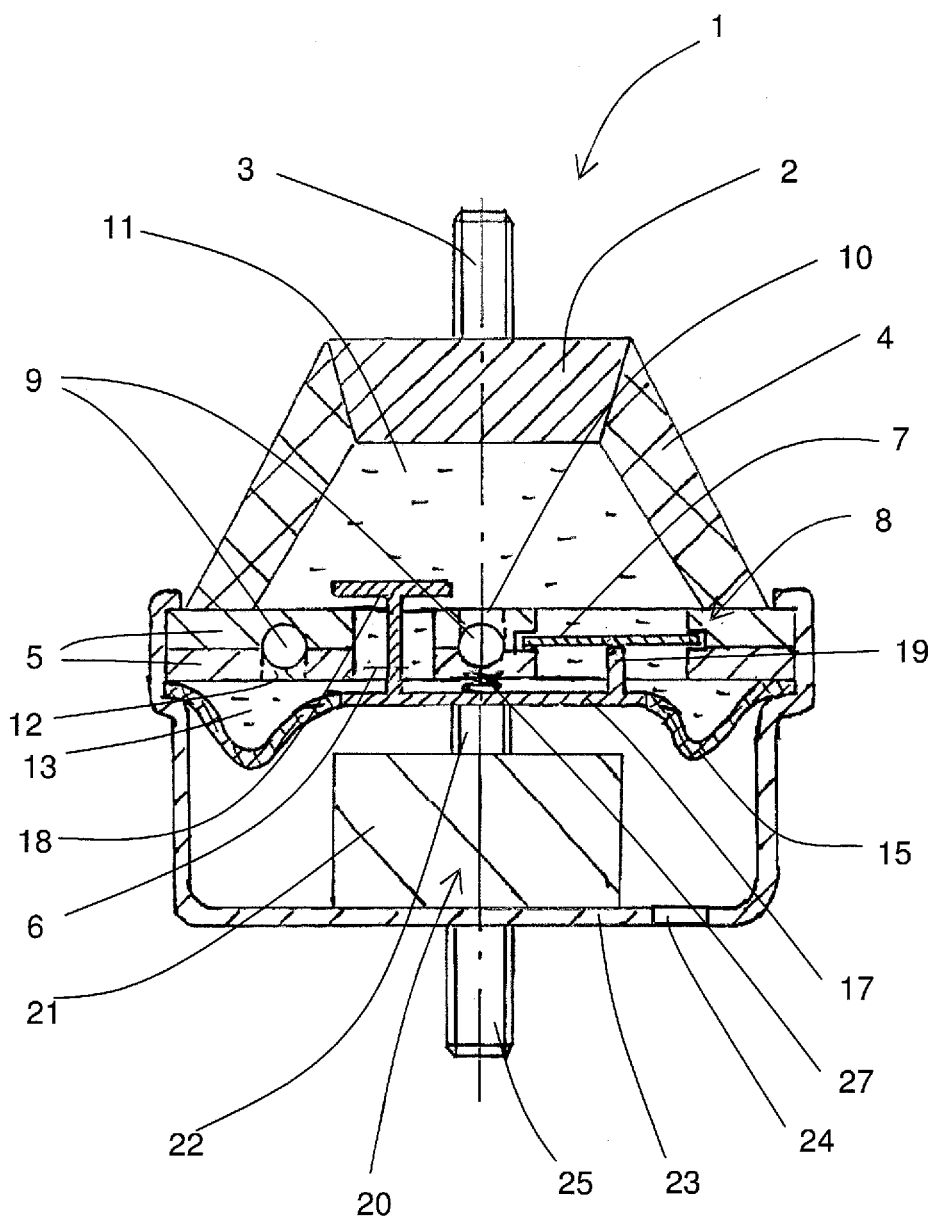
FIG. 2 shows a basic representation of the mount according to the invention with an open bypass in a longitudinal section.

This state is represented in FIG. 2. FIG. 2 shows the engine mount 1 once again, now with the bypass 6 open. The closure device 17 has been raised in the direction of the working chamber 11 by the spindle 22 being displaced axially by the stepping motor 21, so that the closure part 18 clears the bypass 6. At the same time, the blocking elements 19 are pressed against the decoupling membrane 7, so that the decoupling membrane in the receptacle 8 is fixed against the throttle disc 5 and can no longer vibrate.

Figure 3:
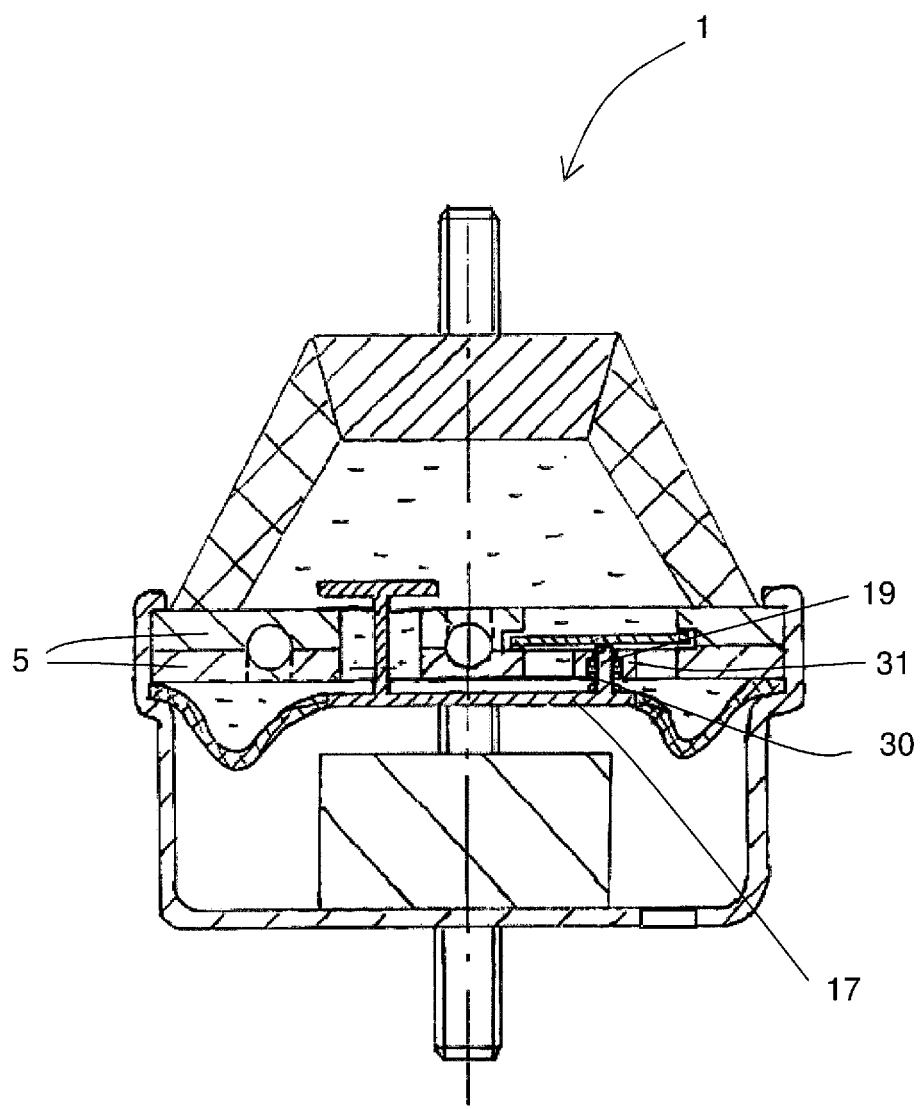
FIG. 3 shows a basic representation of the mount according to the invention with an open bypass and springs in a longitudinal section; and, FIG. 4 shows a basic representation of the mount according to the invention with a sealing continuation of the equalizing membrane.

In FIG. 3, the mount 1 is shown with a modified arrangement of the spring support. A central spring is not provided here. Instead, the blocking elements 19 have respective springs 30, which springs are formed as helical springs and only one of which is shown here. The springs 30 are arranged around the blocking elements 19, so that each blocking element 19 centers the spring 30 corresponding thereto.

The springs 30 are supported at their first end on the closure device 17 and at their second end, facing the throttle disc 5, against an abutment 31 connected to the throttle disc 5.

Figure 4:
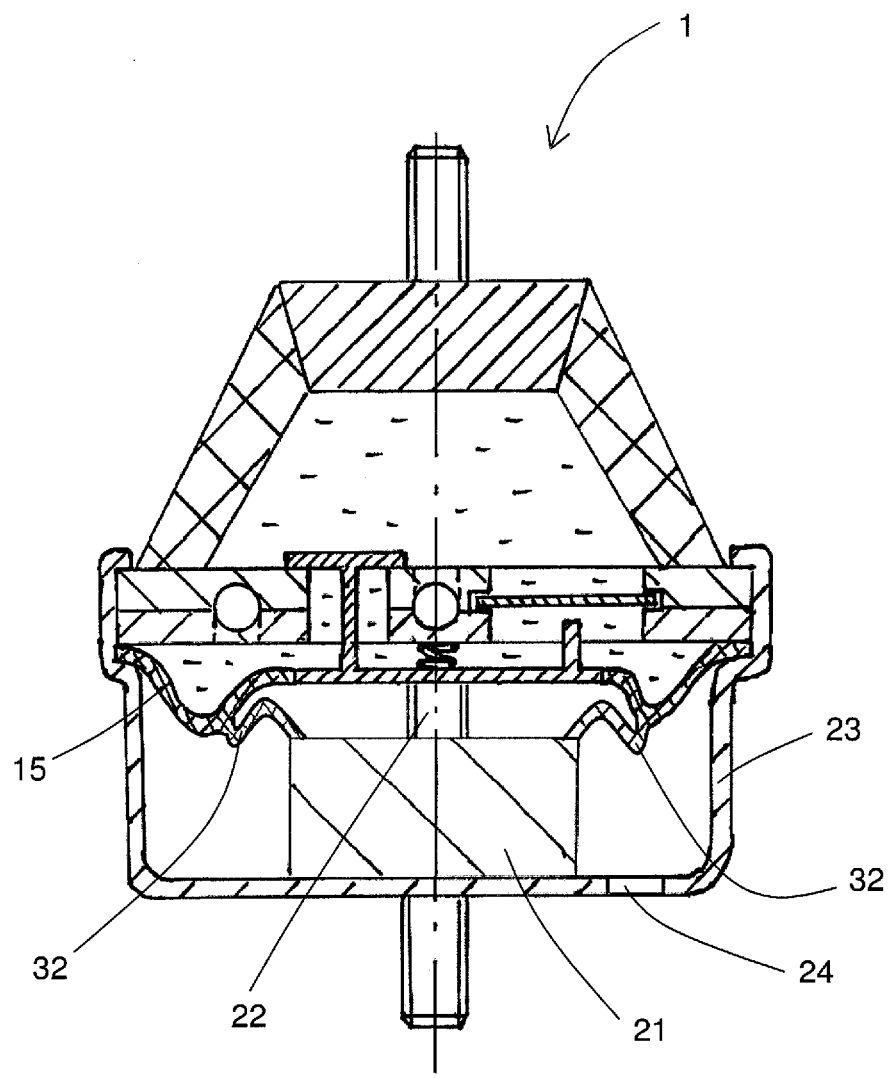

The mount 1 shown in FIG. 4 corresponds to that of FIG. 1, but here additionally has a extension 32 in the form of a bellows connected with a material bond to the equalizing membrane 15. The extension 32 points in the direction of the stepping motor 21 and is arranged around the spindle 22. At its end facing away from the equalizing membrane 15, the extension 32 is connected firmly and in a fluid-tight manner to the stepping motor 21. As a result, any moisture that may penetrate through the bore 24 into the mount pot 23 cannot penetrate between the spindle 22 and the stepping motor 21 into the stepping motor 21.

It is understood that the foregoing description is that of the preferred embodiments of the invention and that various changes and modifications may be made thereto without departing from the spirit and scope of the invention as defined in the appended claims.

LIST OF DESIGNATIONS (Part of the Description)

1 engine mount according to the invention
2 connecting piece
3 fastening bolt
4 supporting spring
5 throttle disc
6 bypass
7 decoupling membrane
8 receptacle
9 throttle channel
10, 12 ends of the throttle channel 9
11 working chamber
13 equalizing chamber
15 equalizing membrane
17 closure device
18 closure part
19 blocking elements
20 drive
21 stepping motor
22 spindle
23 mount pot
24 bore in mount pot 23
25 fastening bolt
26 fluid 27 spring
30 springs of the blocking elements 19
31 abutment of the springs 30
32 extension of the equalizing membrane 15

What is claimed is:

1. A hydraulic mount comprising:

a fluid-filled working chamber subject to pressure acting in main direction and having an elastomeric spring defining a first elastomeric body;

a fluid-filled equalizing chamber having an elastomeric equalizing membrane defining a second elastomeric body;

a throttle disc separating said working chamber and said equalizing chamber from each other;

said working chamber and said equalizing chamber defining respective volumes configured to change in an interacting manner by deformation of at least one of said first and said second elastomeric bodies;

said throttle disc having a throttle channel connecting said working chamber to said equalizing chamber to conduct fluid therebetween;

said throttle disc having a decoupling membrane configured to act parallel to said throttle channel;

a closure device having a closure part and a drive;

said throttle disc having a bypass configured to be openable into an open state by said closure device in a first switching position of said closure device and closable into a closed state by said closure device in a second switching position of said closure device;

said bypass defining an axis and being configured to enable a fluid-conducting communication between said working chamber and said equalizing chamber when said bypass is in said open state;

said closure device being movable parallel to said axis of said bypass and having an opening direction which is opposite to said main direction of pressure acting in said working chamber;

said decoupling membrane being formed as a rigid plate having a clear path in the direction of vibration of the fluid toward said throttle disc and, because of said clear path, said decoupling membrane is supported in said throttle disc so that it can vibrate; and, said closure device further having a blocking element configured to block said decoupling membrane in said first switching position of said closure device when said bypass is open and configured to release said decoupling membrane in said second position of said closure device when said bypass is closed.

2. The hydraulic mount of claim 1, wherein:

said closure device has a plurality of blocking elements and a plurality of springs assigned to corresponding ones of said blocking elements; and, said springs have a force effect which is directed in opposition to said opening direction of said closure device.

3. The hydraulic mount of claim 1, wherein said drive of said closure device comprises an electronically driveable stepping motor having a translatorily movable spindle.

4. The hydraulic mount of claim 3, wherein:

said equalizing membrane has an extension connected thereto so as to define a single piece therewith with said extension being configured as a covering bellows;

said equalizing membrane having a first side facing away from said equalizing chamber; and, said covering bellows being arranged on said first side of said equalizing membrane in such a manner that said covering bellows is configured to reach around said spindle of said stepping motor and reach up to said stepping motor.

* * * * *